United States Patent
Beckers

(10) Patent No.: US 9,032,690 B2
(45) Date of Patent: May 19, 2015

(54) INSULATION ELEMENT FOR A FLAT ROOF OR A FLAT INCLINED ROOF, ROOFING SYSTEM FOR A FLAT ROOF OR A FLAT INCLINED ROOF AND METHOD FOR PRODUCING AN INSULATION ELEMENT

(75) Inventor: Hendricius Geradus Maria Beckers, Maasbracht (NL)

(73) Assignee: Rockwool International A/S, Hedehusene (DK)

( * ) Notice: Subject to any disclaimer, the term of this patent is extended or adjusted under 35 U.S.C. 154(b) by 0 days.

(21) Appl. No.: 14/342,807

(22) PCT Filed: Aug. 2, 2012

(86) PCT No.: PCT/EP2012/065186
§ 371 (c)(1),
(2), (4) Date: Mar. 5, 2014

(87) PCT Pub. No.: WO2013/034376
PCT Pub. Date: Mar. 14, 2013

(65) Prior Publication Data
US 2014/0190107 A1    Jul. 10, 2014

(30) Foreign Application Priority Data
Sep. 6, 2011    (EP) .................................... 11007230

(51) Int. Cl.
| | |
|---|---|
| *E04F 13/075* | (2006.01) |
| *E04D 11/02* | (2006.01) |
| *E04D 13/16* | (2006.01) |
| *B32B 37/26* | (2006.01) |
| *B32B 38/00* | (2006.01) |

(52) U.S. Cl.
CPC .............. *E04F 13/075* (2013.01); *E04D 11/02* (2013.01); *E04D 13/16* (2013.01); *B32B 37/26* (2013.01); *B32B 38/164* (2013.01)

(58) Field of Classification Search
CPC ....... E04D 13/16; E04B 1/625; E04B 1/7662; B32B 5/022; B32B 27/12
USPC .......... 52/309.1, 309.8, 782.1, 787.11, 796.1, 52/660, 664, 676, 666, 673, 52/309.13–309.14, 745.19, 746.1, 746.11
See application file for complete search history.

(56) References Cited

U.S. PATENT DOCUMENTS

| | | | |
|---|---|---|---|
| 2,123,452 A * | 7/1938 | Carrington ..................... | 123/255 |
| 8,257,483 B2 * | 9/2012 | Aerts et al. ..................... | 106/248 |

(Continued)

FOREIGN PATENT DOCUMENTS

| | | |
|---|---|---|
| DE | 20220257 U1 | 5/2003 |
| DE | 102013205672 A1 * | 10/2014 |

(Continued)

*Primary Examiner* — Jeanette E Chapman
(74) *Attorney, Agent, or Firm* — Harness, Dickey & Pierce P.L.C.

(57) ABSTRACT

An insulation element for thermal and/or acoustic insulation of a flat roof or a flat inclined roof comprises a first layer made of mineral fibers, and a second layer made of at least one fabric, whereby the second layer is fixed to a major surface of the first layer by an adhesive. To reduce the adhesive costs and the risk of blistering the roof membrane at the application stage, the second layer is impregnated with a filler. The second layer in combination with the filler has a permeability allowing hot air gases to pass through the second layer and closing the second layer for the penetration of a glue or adhesive in the direction to the first layer.

15 Claims, 1 Drawing Sheet

(56) References Cited

U.S. PATENT DOCUMENTS

2007/0298235 A1* 12/2007 Yoshida et al. ............ 428/294.7
2009/0208714 A1   8/2009 Currier et al.
2012/0260422 A1* 10/2012 Rock et al. .................... 5/483
2013/0295813 A1* 11/2013 Hansen et al. ............... 442/327
2014/0115783 A1*  5/2014 Rock et al. .................... 5/502

FOREIGN PATENT DOCUMENTS

| GB | 650977 A | * | 3/1948 |
| GB | 791981 A |   | 3/1958 |
| GB | 1468065 A | * | 3/1977 |
| WO | WO-98-31895 A1 | | 7/1998 |
| WO | WO-2010-130416 A2 | | 11/2010 |

* cited by examiner

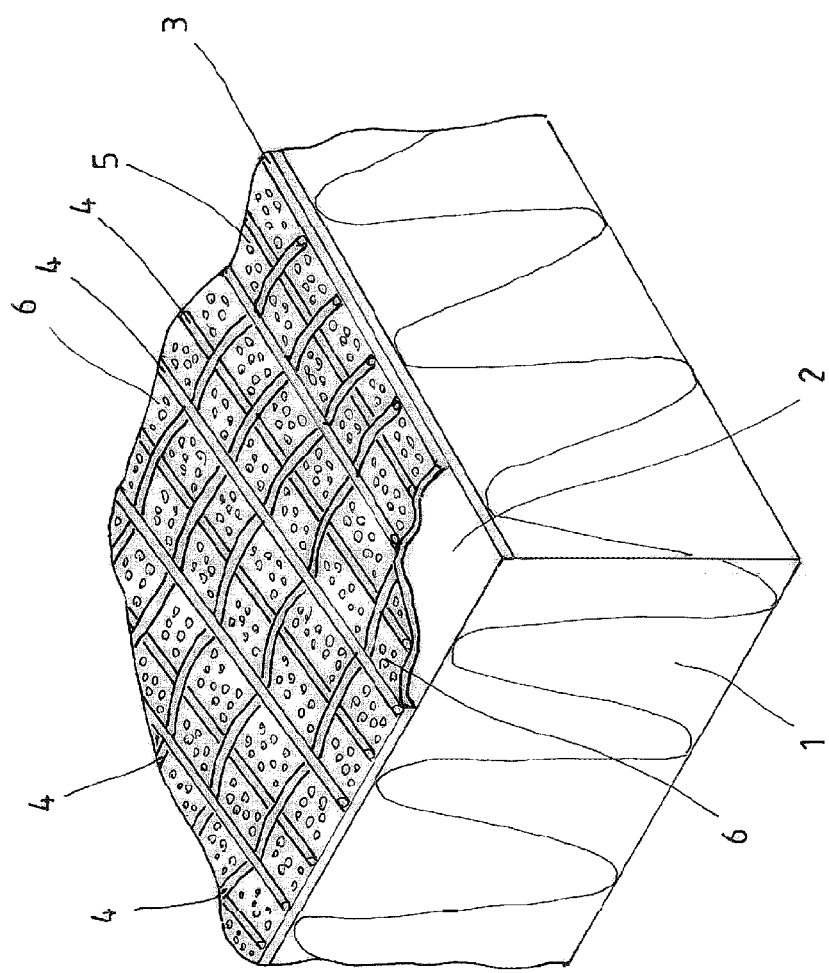

INSULATION ELEMENT FOR A FLAT ROOF OR A FLAT INCLINED ROOF, ROOFING SYSTEM FOR A FLAT ROOF OR A FLAT INCLINED ROOF AND METHOD FOR PRODUCING AN INSULATION ELEMENT

CROSS-REFERENCE TO RELATED APPLICATIONS

This application is a National Stage of International Application No. PCT/EP2012/065186, filed on Aug. 2, 2012, and published in English as WO 2013/034376 A1 on Mar. 14, 2013. This application claims the benefit and priority of European Application No. 11007230.3, filed on Sep. 6, 2011. The entire disclosures of the above applications are incorporated herein by reference.

BACKGROUND

This section provides background information related to the present disclosure which is not necessarily prior art.

TECHNICAL FIELD

The present invention relates to an insulation element for thermal and/or acoustic insulation of flat roofs or flat inclined roofs, comprising a first layer made of mineral fibres, especially stone wool fibres, and a second layer made of a fabric e.g. a glass fibre fleece being impregnated with a filler, whereby the second layer is fixed to a major surface of the first layer by an adhesive. The invention relates furthermore to a roofing system for a flat roof or a flat inclined roof comprising at least one of such insulation elements and a substructure carrying the insulation element. Finally the invention relates to a method of producing such an insulation element.

DISCUSSION

Flat roofs and flat inclined roofs are well known in the prior art, e.g. as membrane roof systems which are generally divided into the following types, according to the position in which the principal thermal insulation is placed: warm roofs, inverted warm roofs, roof gardens or green roofs, and cold roofs.

Membrane roof systems nowadays are often built as single ply roofing systems that are used to protect flat roofs or flat inclined roofs from all weather conditions likely to be experienced during their design life.

A typical single ply roof system comprises: a structural support, a deck providing continuous support, a vapour control layer (if required), thermal insulation (if required), a waterproof membrane and a traffic or load resistant finish (if required for functional and/or aesthetic reasons).

The present invention primarily relates to the so called warm roofs in which the principal thermal insulation is placed immediately below the roof covering, namely the waterproof membrane. The three principal options for attachment of single ply roofing systems are mechanical fastening, adhesion/cold gluing, ballast whereby the insulation and the membrane may be either attached by the same or a different method.

However, the invention relates to a roofing system whereby the membrane is bonded to the substrate using a proprietary cold adhesive. Systems can be either fully or partially bonded.

It is also known to use layers of mineral fibres, for instance glass fibres, as a tissue across the mineral fibre boards whereby it is sandwiched between the board and the impermeable sheet. A panel formed of several boards arranged side-by-side may have a layer of tissue extending across its entire area. The tissue may be adhered to the board(s) by an adhesive applied between the contacting surfaces. The tissue holds the board's position in the panel and may improve the mechanical strength by enabling forces exerted on one board to be transferred to the adjacent board. The tissue has small pores, for instance having an average pore size or distance between adjacent fibres of less than 0.5 mm, for instance as little as 0.1 mm.

State of the art roofing systems make use of tissue and fabric faced or bitumen coated roof boards to provide an adequate surface of the insulation layer for the gluing/bonding of the waterproof membrane. These systems can be used but may however have the disadvantage that adhesives may disperse into the insulation layer. Such dispersed adhesive significantly decreases the insulation and/or damping characteristics of said insulation layer. Moreover, dispersed adhesive will result in higher glue consumption and uncontrolled adhesion strength thus causing higher system costs.

Finally, such adhesives which normally are organic adhesives reduce the fire resistance of the insulation elements, in particular in case of bitumen coated roof boards as they are mentioned above.

For example WO 98/31895 discloses a roofing system comprising a mineral fibre core, a fabric overlying the core and united to the core by a resin to form a panel and a moisture/water impermeable sheet overlying the fabric, which is joined to the panel by an adhesive which penetrates into the mineral fibre core. Although this composite roof system is widely used for flat and flat inclined roofs it has several disadvantages as described before.

SUMMARY OF THE INVENTION

To avoid these disadvantages the insulation element, according to the teachings of the present disclosure, is characterized in that the second layer is impregnated with a filler and in that the second layer in combination with the filler has a permeability allowing gaseous matter, e.g. hot air gases to pass through the second layer and closing the second layer for the penetration of a glue or an adhesive in the direction to the first layer. Moreover, the permeability allows potential gases emitting from glues or adhesives during drying/hardening to enter into and release within the first layer thus remarkably reducing the risk of blistering of the roof membrane at the application stage. Most roof glues or adhesives will emit gases during drying/hardening. If the roof membrane is applied too short after applying the glue then the gases will cause blisters (weak spots) in case the porosity/permeability of the second layer is too low.

This insulation element can especially be used for the thermal and/or acoustic insulation of flat or flat inclined roofs, in particular as roof board suitable for cold gluing of waterproof membranes because of its low porosity which avoids absorbance of the adhesive that is used for gluing the membranes. Because of this the adhesive consumption for the roofer will be reduced and less adhesive costs are the result. Although less adhesive is necessary the bonding of the roof membrane to the insulation elements is improved because nearly the whole amount of adhesive can be utilized to affix the roof membrane to the insulation elements. However, on the other hand the porosity is high enough so that the insulation elements together with the second layer and the filler can be produced in the usual way which means that the insulation element according to the invention can be cured in a widely used curing oven so that the usually used binder present in the first layer can be hardened in a traditional manner without significantly changing the parameter settings of the curing oven such as temperature, transport velocity and the like. The porosity of the insulation element is controlled and adjusted by the porosity/permeability of the second layer and the filler which filler can be composed of particles of a certain size and a binder.

The second layer is preferably made of a glass fleece especially a glass fleece having a basic area weight between 40 g/m$^2$ to 80 g/m$^2$, preferably of 55 g/m$^2$ to 65 g/m$^2$ without or before the addition of the filler and binder as well as other additives. Such a glass fleece maybe of the C- or E-glass type or a textile glass fibre, like e.g. a microlith-glass fibre nonwoven, type SH 50/18 or SH 60/6 from Johns Manville. Such glass fleece has the advantage that a fire classification of Euroclass A according to European Standard EN 13501-1 of the insulation element can be obtained.

According to a further embodiment of the invention the filler is an inorganic material, especially lime. Furthermore, the glass fleece contains a water repellant agent.

The amount of the water repellant has to be adjusted so that the binder which is applied to the glass fleece is able to form a film to the glass fleece and hence to bond the glass fleece to the first layer. By using a water repellant up to a specific amount binder stains can be avoided on the facing of the insulation element.

To achieve a good hydrophobicity of the insulation element respectively the insulating roof board emulsified hydrophobing agent can be added to the binder for adhering the second layer, especially the glass fleece to the first layer. It has been discovered that a traditional phenolic binder, e.g. phenol-formaldehyde resole resins and their modifications as adhesive between the second layer and the first layer is of particular advantage. However, alternative binders or adhesives might be used for the same purpose if feasible. Especially adding of silane is of advantage to improve the aging behavior.

According to yet another preferred embodiment of the invention the second layer in combination with the filler has a porosity respectively a permeability between 250 m/h and 750 m/h, preferably between 400 m/h and 600 m/h, even more preferred of 500 m/h according to DIN EN ISO 9237 at dP of 200 Pa and on an test area of 20 cm$^2$.

Finally, the insulation element made of mineral fibres according to the invention is developed in an advantageous way with a first layer comprising at least two layers of different densities whereby the layer with the higher density is connected to the second layer. Using a layer with higher density in the area underneath the second layer has the advantage that the insulation element can withstand high point loads.

The roofing system according to the invention has a cold gluing roof membrane being fixed to the surface of the insulation element carrying the second layer with the filler whereby the insulation element has the before mentioned features.

The method for producing an insulation element according to the above standing description is characterized in that a second layer, especially of a glass fibre fleece is coated with a filler and the second layer with the filler is adhered to the first layer by a binder. Normally, the fleece with the filler is prefabricated so that the filler is already cured before adhering the fleece including the filler to the first layer. Therefore, the fleece will be supplied as a prefabricated solution containing the filler and will then be applied before the curing oven using the ordinary binder which is also used for binding the mineral fibres. Such a prefabricated second layer has the advantage that it is permeable for the hot air gases of the curing oven. Thus it is relevant to note that the binder adhering the second layer to the first layer is not part of the fleece or filler but might be incorporated in the first layer or otherwise be applied to either the fleece or the first layer before the curing oven.

Therefore, the insulation element is cured in an oven after the second layer is adhered to the first layer. Using a binder according to the binder being part of the first layer has the advantage that both binders are cured during the same method step and no additional binder has to be applied.

Finally according to a further embodiment of the invention an emulsified hydrophobing agent is added to the binder being applied to the second layer. This further method step gives good hydrophobicity to the insulation element which is useful in a flat roof or a flat inclined roof.

The before described insulation element has a high fire resistance so that it e.g. can be classified in Euroclass A2 according to European Standard EN 13501-1. Furthermore, said insulation element according to the invention is universal applicable and guarantees a good point load due to the presence and the load distributing properties of the glass fibre fleece. The glass fibre fleece has a kind of semi-permeability because it is closed for the dispersion of an adhesive and/or a binder being applied on the main surface for example a cold glue in the direction to the first layer being the layer having damping and/or insulation characteristics. On the other hand the second layer especially the glass fibre fleece with the filler is permeable for hot gases being used in the curing oven to cure the binder. This permeability is not limited to a certain direction so that the hot gases can disperse through the whole insulation element from the first layer to the second layer and vice versa.

The present invention gives excellent, mechanical characteristics, especially improved point load resistance as compared to a comparable panel having only a layer of tissue across its surface.

BRIEF DESCRIPTION OF THE DRAWING

The invention is illustrated in the accompanying drawing, which is a perspective view of a portion of an insulation element showing the layers in cross section.

The drawing described herein is for illustrative purposes only of selected embodiments and not all possible implementations, and is not intended to limit the scope of the present disclosure.

DETAILED DESCRIPTION OF THE PREFERRED EMBODIMENTS

Example embodiments will now be described more fully with reference to the accompanying drawing.

In the FIGURE a first layer 1 made of stone wool fibres bonded with a binder is covered by an adhesive 2 which fixes a second layer 3 to the first layer 1 on one major surface of the first layer 1. The first layer 1 made of stone wool fibres has a density in the range 100 to 250 kg/m$^3$, preferably in the range 130 to 220 kg/m$^3$, even more preferred in the range of 140 to 180 kg/m$^3$.

The second layer 3 is formed of nonwoven strands 4 each of many filaments of glass fibre forming a glass fleece. The second layer 3 has a surface weight of approx. 60 g/m$^2$. Between the filaments pores 5 are arranged and filled with a filler 6 consisting of particles of lime and a binder which binder is equal to the binder binding the stone wool fibres of the first layer 1.

The particles of lime have a certain grain size so that the second layer 3 has a permeability allowing hot air gases to pass through the second layer 3 and closing the second layer 3 for a transmission of glue in the direction to the first layer 1.

The second layer 3 namely the glass fleece contains a water repellant agent. Furthermore, the adhesive 2 contains an emulsified hydrophobing agent.

The adhesive 2 is a phenolic binder with added silane.

The second layer 3 which is preferably a fleece being impregnated and consist of glass fibre non-wovens has fibres with a preferred fibre diameter of 10 μm to 13 μm. This second layer 3 without the filler has a preferred weight per area unit of 35 to 60 g/m$^2$, a preferred binder content between 18 and 24% and a preferred tensile strength of 120 to 325 n/50 mm. Together with the filler the second layer has an area weight between 200 and 500 g/m$^2$. The composition of the second layer and the filler contains 10% up to 17% fibres, 2% up to 5% binder for the glass fibres, approximately 30% up to 50% filler, especially lime (Ca(OH)$_2$) or limestone (CaCO$_3$), a flame retardant, for example Al(OH)$_3$ of approximately 35% to 55%, especially 40% to 50% and a water repellant agent, for example Fluorocarbon (C$_6$-C$_8$) of approximately 1% to 2%. All before named percent are weight-percent. Finally, a binder for additives of approximately 5 wt.-%, for example acrylic based binder with styrene part and melamine based cross linker is used.

The permeability of an insulation element for thermal and/or acoustic insulation of a flat roof or a flat inclined roof comprising the before mentioned features is calculated as R expressed in mm/s using the equation $$R = \frac{\overline{q}_V}{A} \times 167$$

where $\overline{q}_v$ is the arithmetic mean flow rate of air, in cubic decimeters per minute (liters per minute);
where A is the area of the insulation element under test in square centimeters and
where 167 is the conversion factor from cubic decimeters (or liters) per minute per square centimeter to millimeters per second.

A flat roof or flat inclined roof using insulation elements according to the invention contains as substructure a trapezoidal steel deck with profiles called "106 profile" having a thickness of 0.75 mm. On top of this substructure a first layer made of mineral fibre boards with dimensions 1000 mm×600 mm and a thickness of 100 mm is mechanical fastened with five fasteners for each board. As fastening system fasteners named "Eurofast TLKS-75-100" are used. The mineral fibre boards are equipped with a second layer being impregnated with a filler according to the teachings of the present disclosure.

On top of this second layer a roof waterproofing sheet is fixed which roof waterproofing sheet is fully bonded to the mineral fibre boards with an adhesive. The joints between neighboring roof waterproofing sheets are welded with a welding machine. The welding is set by a temperature of 550° C. and a speed of 2.2 m/min with 100% air. An adhesive is applied on the mineral fibre board after these have been moistened slightly with approximately 480 gr/m$^2$. After at least 24 hours a theoretical load of Δ W$_{max}$ 100% of 8.0 kPa has been achieved and the system collapsed by higher loads by delamination of the mineral fibre boards. According to the European directive M.O.A.T. No. 65:2001 the admissible (design) load for the wind uplift resistance is 5.0 kPa.

According to the second embodiment of a flat roof or a flat inclined roof a primer with a consumption of approximately 300 gr/m$^2$ has been arranged on top of the mineral fibre boards. The primer has been evaporated for approximately 35 minutes before applying a roof waterproofing sheet which is fully bonded to the mineral fibre boards after a period of at least 4 days a theoretical load of Δ W$_{max}$ 100% of 8.0 kPa has been achieved. The system collapsed by pulling out of a fastener out of the substructure. According to the European directive M.O.A.T. No. 66:2001 the admissible (design) load for the wind uplift resistance is 5.33 kPa. The self-adhesive roof waterproofing sheet is a heat-weldable synthetic rubber waterproofing membrane, self-adhesive, root resistant according to EN 13948.

In both examples fasteners have been used with a decking plate made of plastic and a length of 65 mm.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An insulation element for thermal and/or acoustic insulation of a flat roof or a flat inclined roof, comprising:
    a first layer made of mineral fibres, especially stone wool fibres,
    a second layer made of at least one fabric, especially a fleece being impregnated,
    whereby the second layer is fixed to a major surface of the first layer by an adhesive,
    wherein
    the second layer is impregnated with a filler and
    the second layer in combination with the filler has a permeability allowing hot air gases to pass through the second layer and closing the second layer for the penetration of a glue or adhesive in the direction to the first layer.

2. The insulation element according to claim 1, wherein the fleece is made of glass fleece especially a glass fleece having an area weight between 40 g/m$^2$ to 80 g/m$^2$, preferably between 55 g/m$^2$ to 65 g/m$^2$.

3. The insulation element according to claim 1, wherein the filler is an inorganic filler, especially lime.

4. The insulation element according to claim 2, wherein the glass fleece contains a water repellent agent.

5. The insulation element according to claim 1, wherein the adhesive contains an emulsified hydrophobing agent.

6. The insulation element according to claim 1, wherein the adhesive is a pure PUF binder, especially with added silane.

7. The insulation element according to claim 1, wherein the first layer comprises at least two layers of different densities whereby the layer with the higher density is connected to the second layer.

8. A roofing system for a flat roof or a flat inclined roof comprising at least one insulation element according to claim 1, a substructure carrying the insulation element and a cold gluing roof membrane being fixed to the surface of the insulation element carrying the second layer with the filler.

9. The insulation element according to claim 1, wherein the second layer in combination with the filler has a permeability between 250 m/h and 750 m/h, preferably between 400 m/h and 600 m/h, even more preferred of 500 m/h according to DIN EN ISO 9237 at dP of 200 Pa and on a test area of 20cm².

10. The insulation element according to claim 1, wherein a surface of the insulation element is fixed to a cold gluing roof membrane.

11. A method for producing an insulation element for thermal and/or acoustic insulation of a flat roof or a flat inclined roof, comprising;

providing a first layer made of mineral fibres, especially stone wool fibres;

providing a second layer made of at least one fabric, especially a fleece being impregnated; and fixing the second layer to a major surface of the first layer by an adhesive, wherein the second layer is impregnated with a filler, and the second layer in combination with the filler has a permeability allowing hot air gases to pass through the second layer and closing the second layer for the penetration of a glue or adhesive in the direction of the first layer.

12. The method of claim 11, wherein a second layer of a fleece is coated with a filler and the second layer with the filler is adhered to the first layer by an adhesive.

13. The method of claim 12, wherein the insulation element is cured in an oven after the second layer is adhered to the first layer.

14. The method of claim 12, wherein an emulsified hydrophobing agent is added to the adhesive being applied to the second layer.

15. The method of claim 11, wherein the second layer in combination with the filler is used having a permeability between 250 m/h and 750 m/h, preferably between 400 m/h and 600 m/h, even more preferred of 500 m/h according to DIN EN ISO 9237 at dP of 200 Pa and on a test area of 20 cm².

* * * * *